Sept. 5, 1933.　　　　A. LYSHOLM　　　1,925,147
ELASTIC FLUID TURBINE PLANT
Filed July 12, 1930　　　3 Sheets-Sheet 1

Sept. 5, 1933.     A. LYSHOLM     1,925,147
ELASTIC FLUID TURBINE PLANT
Filed July 12, 1930     3 Sheets-Sheet 2

Patented Sept. 5, 1933

1,925,147

UNITED STATES PATENT OFFICE 1,925,147

ELASTIC FLUID TURBINE PLANT

Alf Lysholm, Stockholm, Sweden, assignor to Aktiebolaget Ljungströms Ångturbin Stockholm, Sweden, a Swedish joint-stock company Application July 12, 1930, Serial No. 467,421, and in Germany December 13, 1929

18 Claims. (Cl. 60—70)

The present invention relates to elastic fluid turbine plants and has particular reference to turbo electric plants in which the prime mover is divided into a plurality of separate sections operating at different pressures. Still more particularly the invention relates to a turbine plant using as the low pressure section a radial flow turbine of the so-called Ljungstrom type.

The turbine installations hitherto proposed involve a very complicated structure and their manufacture has been very expensive.

The present invention relates to such an installation for operation by an elastic fluid, such as gas or steam, having a high pressure part and a low pressure part, the low pressure part consisting of a radial flow turbine accommodated in a separate turbine casing and having turbine disks rotating in opposite directions, whereby a simplified construction is obtained. The new feature of the invention consists in the fact that the high pressure part is composed of one or several radial flow turbines of the single rotary type and arranged on the same shafts as the low pressure turbine discs, although they may be housed in separate turbine casings.

Further characteristic features of the invention will be described in the following with reference to the accompanying drawings; on which Fig. 1 is a top cross-sectional view of the left hand half of a turbo electric plant embodying my invention;

Fig. 3 is a cross-sectional view on an enlarged scale of another turbine shown in Fig. 1a.

Figure 1:
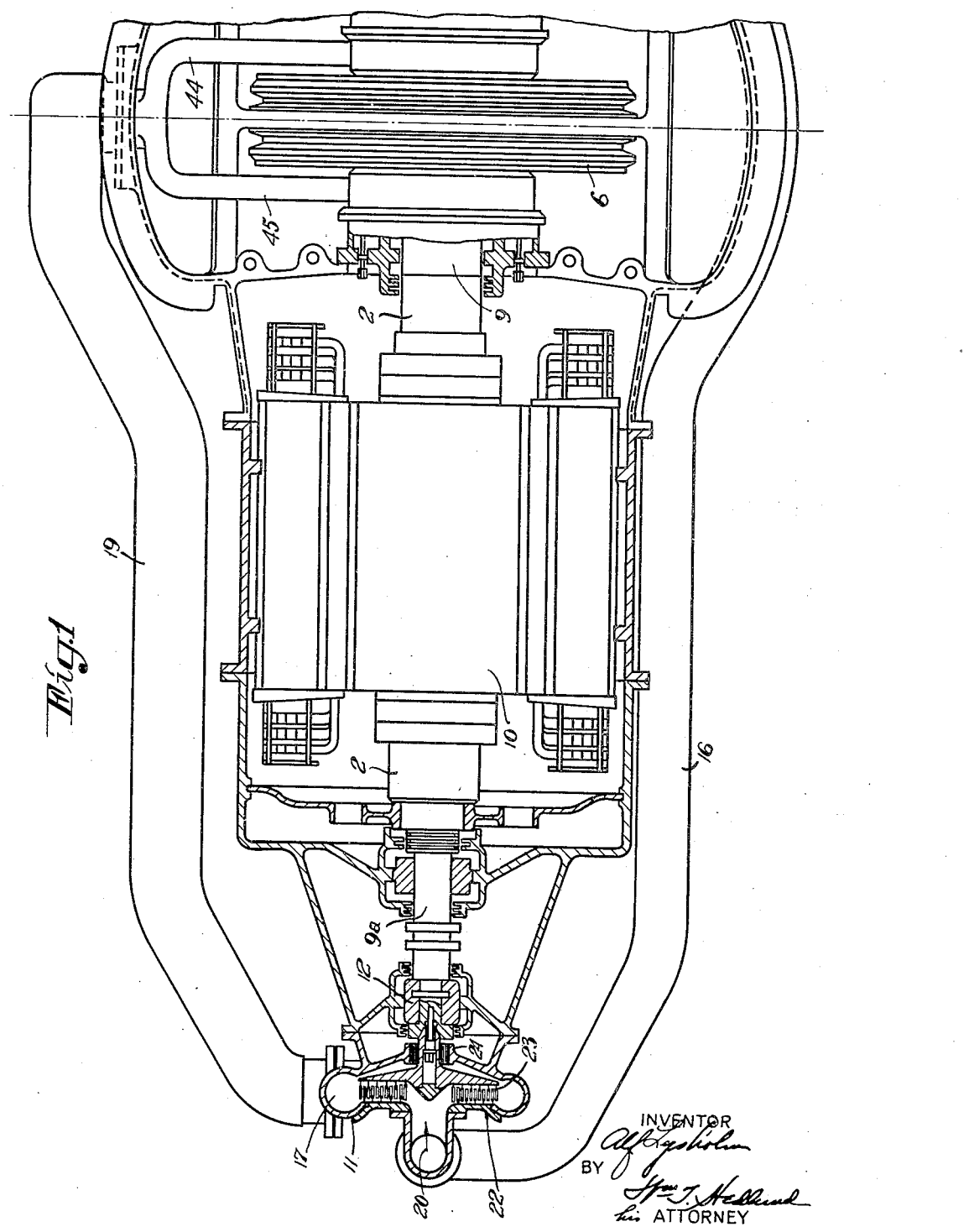
Fig. 1a is a similar view of the right hand half of the plant shown in part in Fig. 1.
Figure 2:
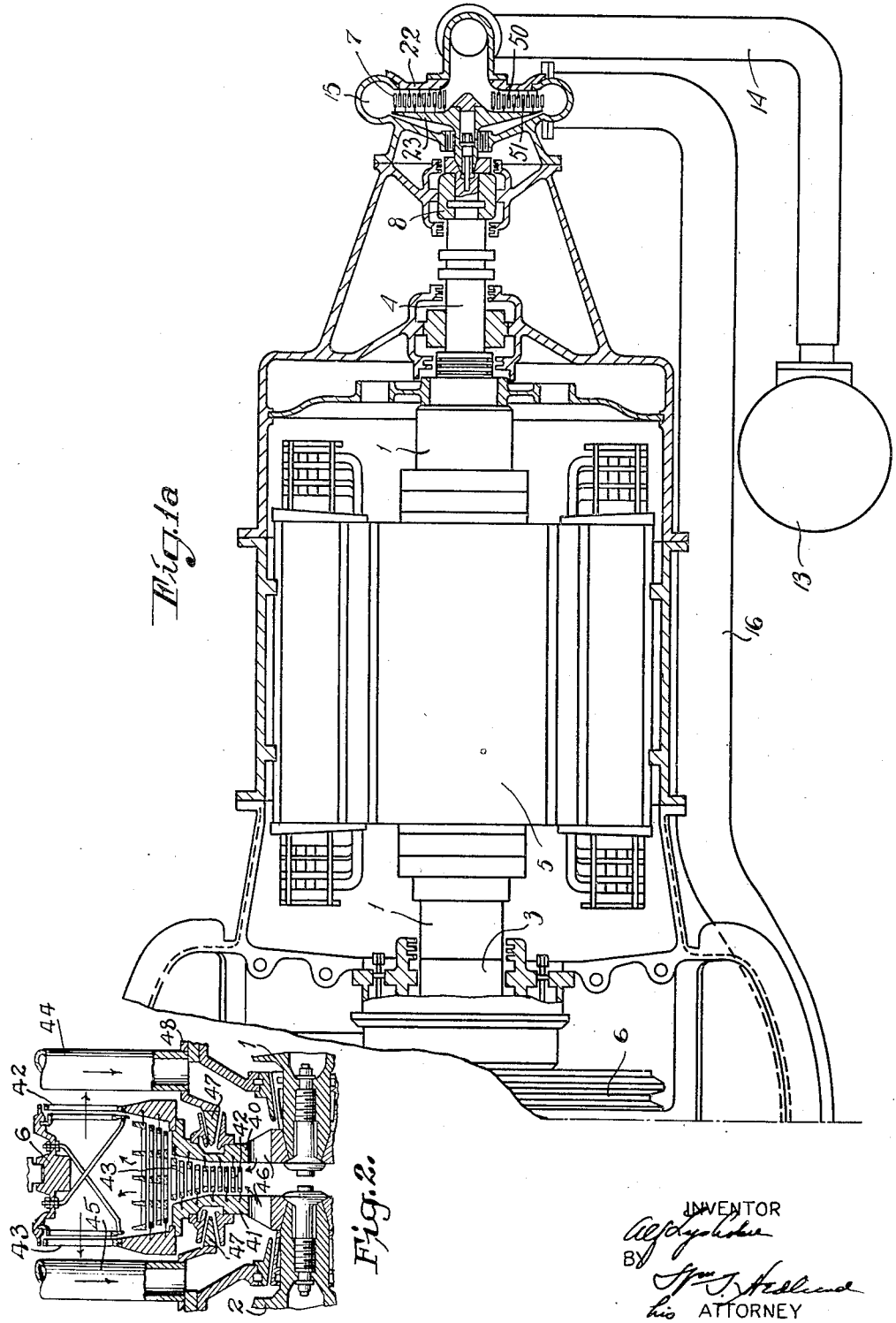
Fig. 2 is a cross-sectional view on an enlarged scale of a portion of one of the turbines shown in Fig. 1.
Figure 3:
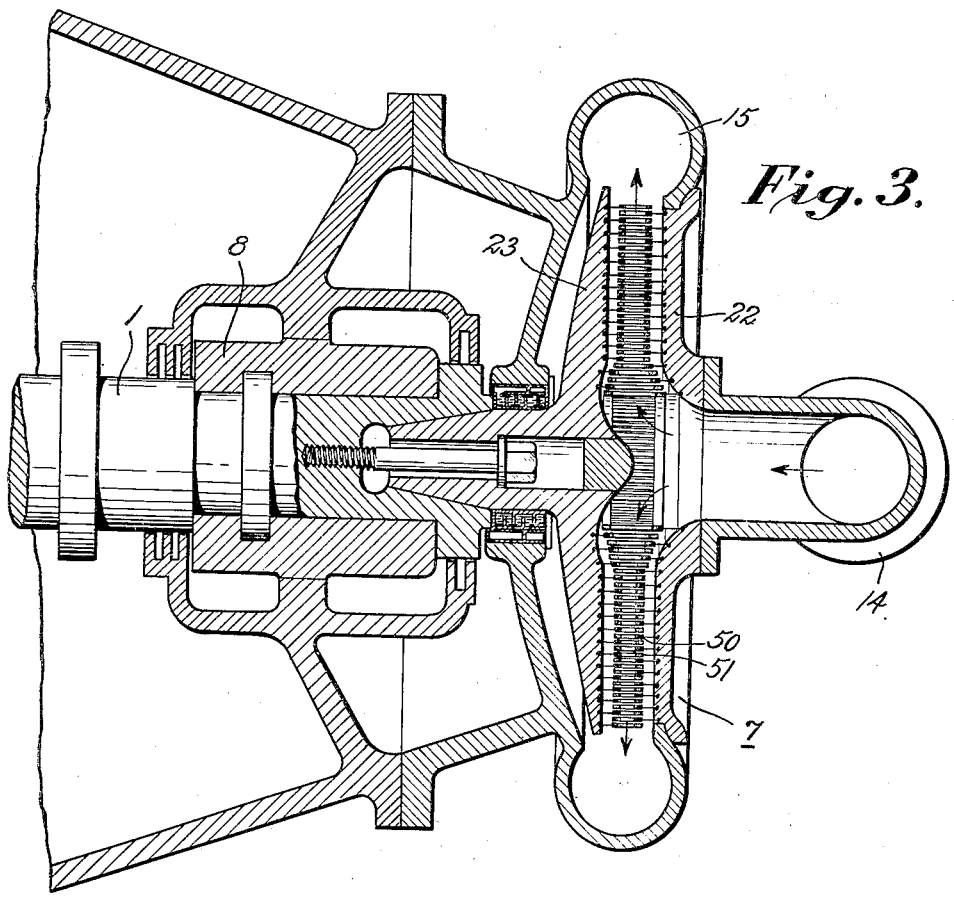

Referring more particularly to Figs. 1, 1a, 2 and 3, reference characters 1 and 2 designate two aligned turbine shafts intended to rotate in opposite directions. Shaft 1 is journalled in bearings 3 and 4 while shaft 2 is journalled in bearings 9 and 9a. Reference character 6 designates generally a radial flow turbine of the double rotary type having two rotating disc 40 and 41. Disc 40 is mounted for rotation on shaft 1 while disc 41 is mounted for rotation on shaft 2. Disc 40 carries a series of blades 42 while disc 41 carries a series of blades 43. An elastic fluid, such as steam, is admitted through conduits 44 and 45 to near the center part of discs 40 and 41, respectively. Passageways 46 allow this steam to pass to the space between the two discs, from whence it flows outwardly in a radial direction between the blades 42 and 43. The steam passing in contact with these blades reacts against them in a well known manner and causes disc 40 to rotate in one direction and disc 41 to rotate in the opposite direction.

There is provided a labyrinth seal 47 between the outside faces of each disc and the housing 48 of the turbine. The steam admitted through conduits 44 and 45 exerts an axial thrust against the outer faces of the discs within the area bounded by the labyrinth seals 47. The steam between the discs exerts a lateral thrust in the opposite direction which is partially balanced by the aforementioned lateral thrust. The two thrusts are not completely balanced due to the fact that the area of the outer faces of the discs bounded by the labyrinth seals is less than the area of the inner faces of the discs. While the resultant thrust may be varied within limits by varying the diameter of the labyrinth seals, and hence the area of the discs bounded thereby, it cannot be completely balanced due to the impracticability from a structural standpoint of making the labyrinth seal of sufficiently large diameter.

Mounted on shaft 1 is a rotor of an electric generator 5 while shaft 2 carries the rotor of a similar generator 10.

Shaft 1 extends through bearing 4 and is journalled in an additional bearing 8. Secured to the end of shaft 1 is the rotor disc 23 of a radial flow turbine 7 of the single rotary type. Turbine 7 is provided with a stationary end wall 22 which carries a series of stationary vanes 50. Disc 23 carries a series of rotating vanes 51. Steam, or other expansive fluid, is admitted to the central part of turbine 7 through a conduit 14 and passes radially in contact with the stationary blades 50 and the rotating blades 51. The reaction of the steam against the blades 51 causes them to rotate and their rotation is imparted to shaft 1 through disc 23. The steam discharged radially from the blades passes into a convolute 15 and thence into a conduit 16.

The steam passing radially between disc 23 and end wall 22 exerts an axial thrust on both the disc and the end wall. The thrust against the wall 22 is transmitted to the frame of the turbine while the thrust against disc 23 is transmitted to shaft 1. This axial thrust exerted in turbine 7 is in the opposite direction from the resultant thrust exerted against the disc 40 in turbine 6. By properly dimensioning the diameter of labyrinth seal 47 the resultant thrust may be made equal to the thrust exerted in turbine 7 and hence these two thrusts substantially neutralize each other.

Conduit 16, which is the exhaust from turbine 7, leads to the inlet of a radial flow turbine 11, the rotor of which is mounted on and rotates with shaft 2. Turbine 11 is in all respects similar to turbine 7. Shaft 2 is journalled in a bearing 12 adjacent to turbine 11.

The axial thrust exerted in turbine 11 neutralizes the resultant axial thrust exerted against disc 41 in turbine 6 in the same manner as that described in connection with turbine 7 and disc 40.

The steam discharged radially from the blades of turbine 11 passes into convolute 17 and thence through the conduit 19 to the inlet of turbine 6. This inlet comprises conduits 44 and 45, previously described.

In the embodiment above described it will be noted that high pressure steam supplied from a suitable source 13 flows serially through turbines 7, 11 and 6 in the order named. The high pressure steam supplied to turbine 7 expands a certain amount while passing through the turbine and is fed at a somewhat lower pressure through conduit 16 to turbine 11. In passing through turbine 11 the steam is further expanded and this lower pressure steam is fed through conduit 19 and conduits 44 and 45 to turbine 6. Turbine 6 may therefore be considered a low pressure section of the turbine plant while turbines 7 and 11 may be termed high pressure sections.

Figure 4:
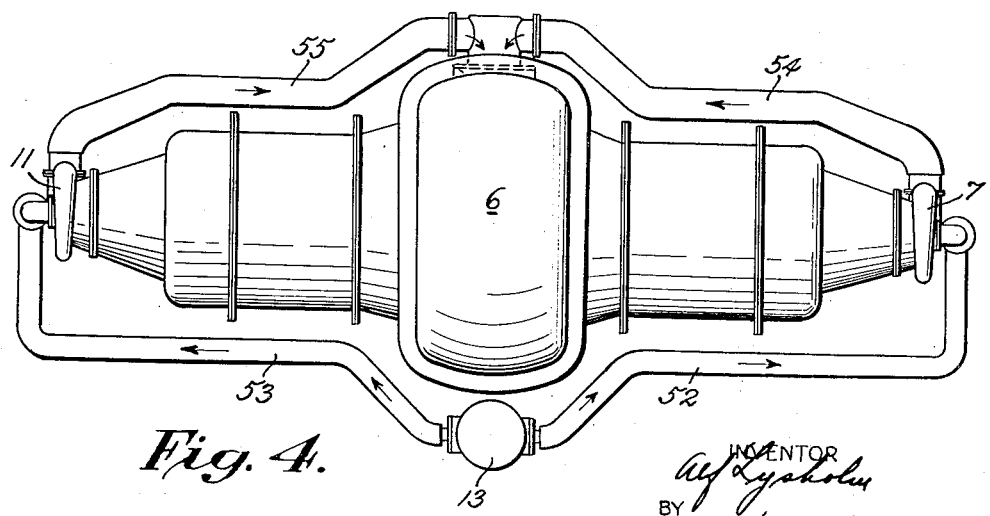
Fig. 4 is a top view of a modified embodiment of my invention.

It is not necessary that turbines 7 and 11 be connected in series. They may, on the other hand, be connected in parallel as is shown in Fig. 4. In this embodiment high pressure steam is supplied from 13 and passes through conduits 52 and 53 to turbines 7 and 11, respectively. The steam discharged from these turbines passes through conduits 54 and 55 to the inlet of low pressure turbine 6. In this event, the steam supplied to both high pressure turbines 7 and 11 may be at the same pressure.

A radial flow turbine of the single rotary type and of the kind described above, may be constructed for the same number of revolutions as a low pressure turbine 6. On this account, the turbine 11, for instance, may be arranged on the same shaft 2 as the turbine 6, thereby rendering a geared connection unnecessary and also avoiding a reduction of the efficiency by such a gearing. The steam friction losses arising in the turbine are regained by reheating the steam discharging from the turbine and will in this manner be to the advantage of the following turbine, considered in the direction of flow of the steam.

In comparison with axial flow turbines, radial flow turbines may be built without a divided blade system or a divided turbine casing, whereby it is possible to produce installations for specially high initial pressures. Radial flow turbines further render possible suitable connections with other turbines belonging to the same installation, because the introduction and also the discharge of the steam is effected without any, or with very inconsiderable, alterations of direction of flow, whereby the losses are kept as low as possible. A turbine installation in accordance with the embodiment above described, will therefore be very simple, as the best rules of construction may find their application with respect to the blade system and also to the surrounding casing and the steam conduits.

The invention is not limited to such installations, in which the high pressure turbines are arranged on the same shaft as the two turbine disks of the low pressure turbine. However, the invention renders possible this kind of construction, by means of which very simplified installations are effected. In addition, one obtains a compensating system between the various turbine disks, which only is possible, in case radial flow turbines, according to the invention, are united with each other. In certain forms of embodiment, the high pressure part may consist of only one single rotary type radial flow turbine arranged on one of the shafts of the low pressure turbine or in another case two single rotary type radial flow turbines may be arranged on one and the same shaft.

The installation may also be built for large capacities, without materially increasing the space required for the same. According to one form of embodiment, the high pressure turbine 7 may for instance be designed for an initial pressure of 100 kg. at a steam temperature of 540° C. The capacity of this turbine may be calculated to be about 5,000 kw. and the capacity of the medium pressure turbine 11 to be about 8,000 kw. at an initial pressure of 60 kg. and a steam temperature of 470° C. The low pressure turbine will then be built for 37,000 kw. at an initial pressure of 26 kg. and a temperature of 350° C.

Several other forms of embodiment are conceivable within the scope of the invention. Thus, for instance, the invention is not dependent upon whether the installation is provided with bleeding devices or arrangements for additional supply of steam.

What I claim is:—

1. In a turbine plant, in combination, a low pressure section comprising a radial flow turbine including oppositely rotating turbine discs mounted on separate shafts, two sections of higher pressure than said low pressure section comprising radial flow turbines each having a single rotating turbine disc, one of said last-mentioned discs being mounted on each of said shafts, means for supplying expansive fluid to the high pressure sections to expand therein and to exhaust therefrom and means for conducting the expanded fluid to said low pressure section for further expansion.

2. In a turbine plant, in combination, a low pressure section comprising a radial flow turbine including oppositely rotating turbine discs mounted on separate shafts, two sections of higher pressure than said low pressure section comprising radial flow turbines each having a single rotating turbine disc, one of said last-mentioned discs being mounted on each of said shafts, means for supplying high pressure expansive fluid to one of said high pressure sections to expand therein and to exhaust therefrom, means for conducting the expanded fluid to the other of said high pressure sections to further expand therein and exhaust therefrom and means for conducting said further expanded fluid to said low pressure section for still further expansion.

3. In a turbine plant, in combination, a low pressure section comprising a radial flow turbine including oppositely rotating turbine discs mounted on separate shafts, two sections of higher pressure than said low pressure section comprising radial flow turbines each having a single rotating turbine disc, one of said last-mentioned discs being mounted on each of said shafts, means for supplying high pressure expansive fluid to the high pressure sections in parallel to expand therein and to exhaust therefrom and means for conducting the expanded fluid from each of said high pressure sections to said low pressure section for further expansion.

4. In a turbine plant, in combination, a low pressure section comprising a radial flow turbine including oppositely rotating turbine discs mounted on separate aligned shafts, means for admitting expansive fluid to the adjacent sides of said discs, two sections of higher pressure than said low pressure section comprising radial flow turbines each having a single rotating disc, one of said last-mentioned discs being mounted on each of said shafts, and means for admitting expansive fluid to one side of each of said last-mentioned discs so that the axial thrust produced thereby will balance the axial thrust exerted against the respective discs of the low pressure section.

5. In a turbine plant, in combination, a low pressure section comprising a radial flow turbine including oppositely rotating turbine discs mounted on aligned shafts, two high pressure sections comprising radial flow turbines each having a single rotating disc, one of said last-mentioned discs being mounted on each of said shafts, means for admitting expansive fluid to the side of each of said last-mentioned discs which is remote from the respective low pressure section disc which is mounted on the same shaft, means for admitting expansive fluid to the sides of the low-pressure section discs near to the respective high pressure section discs, labyrinth seals limiting the area of the said sides of the last-mentioned discs on which the fluid may act, and means for admitting said fluid to the other sides of the last-mentioned discs, the area of said low pressure section discs which is bounded by said labyrinth seals being so proportioned with respect to the area of the other sides of the same discs that the resultant thrust exerted on said low pressure section discs by the fluid balances the thrust exerted on the respective high pressure section discs by the fluid.

6. In a turbine plant, in combination, a low pressure section comprising a radial flow turbine including oppositely rotating turbine discs mounted on separate aligned shafts, means for admitting expansive fluid to the adjacent sides of said discs, two high pressure sections comprising radial flow turbines each having a single rotating disc, one of said last-mentioned discs being mounted on each of said shafts, means for admitting expansive fluid to one side of said last-mentioned discs so that the axial thrust produced thereby will balance the axial thrust against the respective discs of the low pressure section, and means for connecting said high pressure sections to said low pressure section so that the expansive fluid discharged from said high pressure sections is admitted to said low pressure section.

7. In a turbine plant, in combination, a low pressure section comprising a radial flow turbine including oppositely rotating turbine discs mounted on separate aligned shafts, means for admitting expansive fluid to the adjacent sides of said discs, two high pressure sections comprising radial flow turbines each having a single rotating disc, one of said last-mentioned discs being mounted on each of said shafts, means for admitting expansive fluid to one side of said last-mentioned discs so that the axial thrust produced thereby will balance the axial thrust against the respective disc of the low pressure section, and means for connecting said high pressure sections and said low pressure section so that expansive fluid discharged from one of said high pressure sections is admitted to the other of said high pressure sections and expansive fluid discharged from said other section is admitted to said low pressure section.

8. In a turbine plant, in combination, a low pressure section comprising a radial flow turbine including oppositely rotating turbine discs mounted on separate aligned shafts, means for admitting expansive fluid to the adjacent sides of said discs, two high pressure sections comprising radial flow turbines each having a single rotating disc, one of said last-mentioned discs being mounted on each of said shafts, means for admitting expansive fluid to one side of said last-mentioned discs so that the axial thrust produced thereby will balance the axial thrust against the respective discs of the low pressure section, and means connecting said high pressure sections and said low pressure section so that the expansive fluid discharged from said high pressure sections is conducted in parallel to said low pressure section.

9. In a turbine plant, in combination, a low pressure section comprising a radial flow turbine including oppositely rotating turbine discs mounted on aligned shafts, two high pressure sections comprising radial flow turbines each having a single rotating disc, one of said last-mentioned discs being mounted on each of said shafts, means for admitting expansive fluid to the side of each of said last-mentioned discs which is remote from the respective low pressure section disc which is mounted on the same shaft, means for admitting expansive fluid to the sides of the low pressure section discs near to the respective high pressure section discs, labyrinth seals limiting the area of the said sides of the last-mentioned discs on which the fluid may act, means for admiting said fluid to the other sides of the last-mentioned discs, the area of said low pressure section discs which is bounded by said labyrinth seals being so proportioned with respect to the area of the other sides of the same discs that the resultant thrust exerted on said low pressure section discs by the fluid balances the thrust exerted on the respective high pressure section discs by the fluid, and means for connecting said high pressure sections to said low pressure section so that the expansive fluid discharge from said high pressure sections is admitted to said low pressure section.

10. In a turbine plant, in combination, a low pressure section comprising a radial flow turbine including oppositely rotating turbine discs mounted on aligned shafts, two high pressure sections comprising radial flow turbines each having a single rotating disc, one of said last-mentioned discs being mounted on each of said shafts, means for admitting expansive fluid to the side of each of said last-mentioned discs which is remote from the respective low pressure section disc which is mounted on the same shaft, means for admitting expansive fluid to the sides of the low pressure section discs near to the respective high pressure section discs, labyrinth seals limiting the area of the said sides of the last-mentioned discs on which the fluid may act, means for admitting said fluid to the other sides of the last-mentioned discs, the area of said low pressure section discs which is bounded by said labyrinth seals being so proportioned with respect to the area of the other sides of the same discs that the resultant thrust exerted on said low pressure section discs by the fluid balances the thrust exerted on the respective high pressure section discs by the fluid, and means for connecting said high pressure sections and said low pressure section so that expansive fluid discharged from one of said high pressure sections is admitted to the other of said high pressure sections and expensive fluid discharged from said other section is admitted to said low pressure section.

11. In a turbine plant, in combination, a low pressure section comprising a radial flow turbine including oppositely rotating turbine discs mounted on aligned shafts, two high pressure sections comprising radial flow turbines each having a single rotating disc, one of said last-mentioned discs being mounted on each of said shafts, means for admitting expansive fluid to the side of each of said last-mentioned discs which is remote from the respective low pressure section disc which is mounted on the same shaft, means for admitting expansive fluid to the sides of the low pressure section discs near to the respective high pressure section discs, labyrinth seals limiting the area of the said sides of the last-mentioned discs on which the fluid may act, means for admitting said fluid to the other sides of the last-mentioned discs, the area of said low pressure section discs which is bounded by said labyrinth seals being so proportioned with respect to the area of the other sides of the same discs that the resultant thrust exerted on said low pressure section discs by the fluid balances the thrust exerted on the respective high pressure section discs by the fluid, and means connecting said high pressure sections and said low pressure section so that the expansive fluid discharged from said high pressure sections is conducted in parallel to said low pressure section.

12. In a turbine plant, in combination, a low pressure section comprising a radial flow turbine including oppositely rotating turbine discs mounted on separate aligned shafts, means for admitting expansive fluid to the adjacent sides of said discs, two high pressure sections comprising radial flow turbines each having a single rotating disc, one of said last-mentioned discs being mounted on each of said shafts, means for admitting expansive fluid to one side of each of said last-mentioned discs so that the axial thrust produced thereby will balance the axial thrust exerted against the respective discs of the low pressure section, and means for absorbing power from each of said shafts.

13. In a turbine plant, in combination, a low pressure section comprising a radial flow turbine including oppositely rotating turbine discs mounted on separate aligned shafts, means for admitting expansive fluid to the adjacent sides of said discs, two high pressure sections comprising radial flow turbines each having a single rotating disc, one of said last-mentioned discs being mounted on each of said shafts, means for admitting expansive fluid to one side of each of said last-mentioned discs so that the axial thrust produced thereby will balance the axial thrust exerted against the respective discs of the low pressure section, and electric means for absorbing power from each of said shafts.

14. In a turbine plant, in combination, a low pressure section comprising a radial flow turbine including oppositely rotating turbine discs mounted on separate aligned shafts, means for admitting expansive fluid to the adjacent sides of said discs, two high pressure sections comprising radial flow turbines each having a single rotating disc, one of said last-mentioned discs being mounted on each of said shafts, means for admitting expansive fluid to one side of each of said last-mentioned discs so that the axial thrust produced thereby will balance the axial thrust exerted against the respective discs of the low pressure section, and means comprising an electric generator mounted on each of said shafts for absorbing power therefrom.

15. In a turbine plant, in combination, a low pressure section comprising a radial flow turbine including oppositely rotating turbine discs mounted on separate shafts, two sections of higher pressure than said low pressure section comprising radial flow turbines each having a single rotating turbine disc, one of said last mentioned discs being mounted in overhung relation on each of said shafts, means for supplying expansive fluid to the high pressure sections to expand therein and to exhaust therefrom and means for conducting the expanded fluid to said low pressure section for further expansion.

16. In a turbine plant, in combination, a low pressure section comprising a radial flow turbine including oppositely rotating turbine discs overhung on adjacent ends of aligned separate shafts, two sections of higher pressure than said low pressure section comprising radial flow turbines each having a single rotating turbine disc, one of said last mentioned discs being mounted in overhung relation on the remote end of each of said shafts, means for supplying expansive fluid to the high pressure sections to expand therein and to exhaust therefrom and means for conducting the expanded fluid to said low pressure section for further expansion.

17. In a turbine plant, in combination, a low pressure section comprising a radial flow turbine including oppositely rotating turbine discs overhung on adjacent ends of aligned separate shafts, two sections of higher pressure than said low pressure section comprising radial flow turbines each having a single rotating turbine disc, one of said last mentioned discs being mounted in overhung relation on the remote end of each of said shafts, means for supplying expansive fluid to the high pressure sections axially and centrally thereof to expand therein and to exhaust therefrom and means for conducting the expanded fluid to said low pressure section for further expansion.

18. In a turbine plant, a shaft having a radial flow turbine rotor mounted in overhung relation at each end thereof, one of said rotors forming a part of a high pressure radial flow turbine of the single rotation type and the other of said rotors comprising a part of a relatively low pressure radial flow turbine of the double rotation type and means for absorbing power from said shaft.

ALF LYSHOLM.